United States Patent
Romero et al.

(10) Patent No.: US 11,598,426 B2
(45) Date of Patent: Mar. 7, 2023

(54) ROTARY JOINT SHROUD HAVING SET-UP GAUGE AND SEAL WEAR INDICATOR

(71) Applicant: Kadant Johnson LLC, Three Rivers, MI (US)

(72) Inventors: Isaac E. Romero, Kalamazoo, MI (US); Alan T. Ives, Marcellus, MI (US); Zachary S. Newland, Marcellus, MI (US)

(73) Assignee: Kadant Johnson LLC, Three Rivers, MI (US)

( * ) Notice: Subject to any disclaimer, the term of this patent is extended or adjusted under 35 U.S.C. 154(b) by 19 days.

(21) Appl. No.: 17/089,235

(22) Filed: Nov. 4, 2020

(65) Prior Publication Data

US 2021/0148469 A1 May 20, 2021

Related U.S. Application Data

(60) Provisional application No. 62/935,764, filed on Nov. 15, 2019.

(51) Int. Cl.
*F16J 15/38* (2006.01)
*F16J 15/34* (2006.01)

(52) U.S. Cl.
CPC ........... *F16J 15/38* (2013.01); *F16J 15/3452* (2013.01); *F16J 15/3492* (2013.01)

(58) Field of Classification Search
CPC .......... F16J 15/38; F16J 15/34; F16J 15/3452; F16J 15/3492; F16J 15/3436
See application file for complete search history.

(56) References Cited

U.S. PATENT DOCUMENTS

| 2,793,058 | A | * | 5/1957 | Jacobson | ............ | F16L 27/0828 |
| | | | | | | 285/299 |
| 3,874,707 | A | * | 4/1975 | Calkins | ............... | F16L 27/0812 |
| | | | | | | 285/95 |
| 4,606,560 | A | | 8/1986 | McCracken | | |

(Continued)

FOREIGN PATENT DOCUMENTS

DE   20 2019 104631 U1   9/2019

OTHER PUBLICATIONS

International Preliminary Report on Patentability and Written Opinion of the International Searching Authority for PCT Patent Application No. PCT/US2020/060375 dated May 17, 2022, 10 pages.

*Primary Examiner* — Gilbert Y Lee
(74) *Attorney, Agent, or Firm* — Young Basile Hanlon & MacFarlane, P.C.

(57) ABSTRACT

A rotary joint for connecting a stationary body to a rotating body. The rotary joint has a rotatable wear plate connectable to the rotating body and a seal ring seated in the wear plate. A spring-biased piston engages the seal ring against the wear plate by compressed springs between an end flange and the piston. The end flange and the piston are at least partially disposed within a shroud, wherein the shroud has at least one aperture extending there through. Alignment rings are formed on the piston and viewable through the aperture in the shroud to confirm the proper distance between the end flange and the piston and the proper force applied to the piston. A seal wear indicator is connected to the piston and moves between an exposed position, wherein the seal ring is not worn, and a non-exposed position, wherein the seal ring is worn.

20 Claims, 7 Drawing Sheets

(56) References Cited

U.S. PATENT DOCUMENTS

| | | | |
|---|---|---|---|
| 4,606,561 A | | 8/1986 | Jackson |
| 5,098,135 A | | 3/1992 | Timm |
| 5,169,159 A | * | 12/1992 | Pope .................. F16J 15/441 |
| | | | 277/422 |
| 2006/0103073 A1 | * | 5/2006 | Khonsari ............ F16J 15/3404 |
| | | | 277/359 |

* cited by examiner

ROTARY JOINT SHROUD HAVING SET-UP GAUGE AND SEAL WEAR INDICATOR

CROSS-REFERENCE TO RELATED APPLICATIONS

The following U.S. formal patent application claims priority from U.S. provisional patent application No. 62/935,764 filed on Nov. 15, 2019.

FIELD OF THE INVENTION

The present disclosure pertains generally to a piston-type rotary joint for use primarily in the paper manufacturing industry, and in particular, a rotary joint having a shroud that provides a set-up gauge for properly installing the rotary joint and a seal wear indicator to enhance the preventative maintenance of the rotary joint.

BACKGROUND

Rotary joints are commonly used in the paper manufacturing industry to couple sources of steam and condensate with a rotating drying cylinder of a paper-manufacturing machine. The rotary joint provides a pressure-tight joint formed between a revolving journal of the drying cylinder and the stationary construction used to transfer the steam and condensate into and out of the drying cylinder. A seal ring is positioned and pressured against a revolving wear plate attached to the end of the rotating journal of the drying cylinder through the use of a spring-loaded piston and steam pressure. Steam and condensation pipes are passed through the piston, the wear plate, and the journal of the drying cylinder, and the seal ring is fitted to surround the steam and condensation pipes.

The installation of the prior art rotary joints is a time consuming and difficult process. For instance, the rotary joint may provide a piston wherein compression springs are utilized between an end flange and the piston to force the piston against the seal ring, which in turn forces the seal ring against the revolving wear plate and the journal of the drying cylinder. Since the seal ring seals the non-rotating piston from the revolving wear plate and journal, the amount of force applied by the piston to the seal ring is critical. The force applied by the piston to the seal ring is a function of the amount of compression applied to the piston by the compression springs. Therefore, the length at which the compression springs are compressed must be accurately measured upon the assembly of the rotary joint to the drying cylinder. This requires an installer accurately measure the distance between the end flange and the piston, which can be difficult in light of the structure of the rotary joint, and the surrounding equipment as well as the biasing forces of the compression springs.

Due to the revolving wear plate rotating against the seal ring, the seal ring eventually begins to wear. The spring-biased piston continually applies pressure to the seal ring thereby compensating for any wear or loss of material from the seal ring caused from the friction between the seal ring and the wear plate such that the seal ring remains properly seated against the wear plate. Nonetheless, the thickness of the seal ring eventually diminishes thereby requiring that the seal ring be replaced. However, there are few or no effective indicators as to when the seal ring must be replaced. For instance, previous wear indicators have included tabs that are fastened to the spring-biased piston, wherein the tab eventually contacts the wear plate once the seal ring becomes excessively worn. When this occurs, the tab engages the revolving wear plate thereby making a loud squealing noise that is supposed to alert personnel and indicate that the seal ring needs to be replaced. However, papermill facilities are often quite loud, and thus, the noise made by the tab engaging the wear plate may be difficult to hear. In addition, the tab may shear off from the piston once the tab engages the revolving wear plate thereby prohibiting any noise from being made and possibly causing the sheared off tab from damaging the seal ring or other components of the rotary joint. If a wear indicator is not utilized, then the operator may continually measure the distance from the end flange to the piston to determine the amount of wear on the seal ring, or the operator may disassemble the rotary joint to inspect the seal ring. Either way, if a seal ring indicator is not utilized to indicate whether the seal ring is worn, the operator must shut down the entire paper manufacturing process and make the appropriate measurements and inspections. Such measurements and inspections are time consuming, difficult, and create inefficiencies that are undesirable in an industrial environment.

Lastly, the compression springs between the end flange and the piston are typically exposed to the elements of the paper manufacturing process. Since the compression springs are commonly fabricated from metallic materials, the compression springs often rust or become corroded due to the steam and condensate that collect on the compression springs as well as other chemicals that may be utilized in conjunction with the paper manufacturing process. This requires that the compression springs either be replaced or cleaned on a regular basis, which is a time-consuming and costly process that creates inefficiencies in the paper manufacturing process.

It would be desirable to create a rotary joint for the paper manufacturing industry that could be installed and set-up quickly and accurately, while providing a simple indicator as to the wear of the seal ring and providing protection of the compression spring from rust and corrosion created by the steam, condensate, and other chemicals associated with the paper manufacturing process.

SUMMARY OF THE DISCLOSURE

The present disclosure provides a rotary joint for connecting a stationary body to a rotating body having a rotatable wear plate connectable to the rotating body and a seal ring seated in the wear plate. A spring-biased piston engages and maintains the seating of the seal ring against the wear plate, wherein the piston is spring biased by a plurality of compression springs that are compressed between an end flange and the piston to bias the piston toward the seal ring. A shroud is connected to the end flange, and the end flange and the piston are at least partially disposed within the shroud, wherein the shroud has at least one aperture extending there through. The piston has a plurality of annular alignment rings formed thereon, and the plurality of alignment rings are viewable through the at least one aperture in the shroud to confirm the proper distance between the end flange and the piston in order to establish the proper spring force applied to the piston against the seal ring.

The plurality of annular alignment rings comprise annular recesses that are substantially parallel while being axially and equally spaced at predetermined distances.

A seal wear indicator may be connected to the piston and moves between an exposed position, wherein the seal ring is not worn, and a non-exposed position, wherein the seal ring is worn. The seal wear indicator has an annular ring seated within an annular recess on the piston, wherein the annular ring is visible between the shroud and the seal ring in the exposed position, and wherein the annular ring is not visible between the shroud and the seal ring when the annular ring is in the non-exposed position.

The shroud may have a pointer that extends into each of the at least one aperture to assess the position of the plurality of alignment rings.

An identifier may be located on the piston to identify which of the plurality of alignment rings identifies the ideal position for the piston. An aperture may extend through one of the plurality of alignment rings in the piston, wherein the aperture in the piston is circumferentially aligned with the at least one aperture in the shroud to view the aperture in the piston through the at least one aperture in the shroud.

The shroud may be connected to the end flange via a snap fit, wherein the end flange has tabs that extend from the end flange, are received by, and extend into corresponding apertures provided in the shroud. The shroud may further have at least one vent having apertures that extend through the shroud to view and allow fluid to escape through the at least one vent should any fluid inadvertently escape from the rotary joint. The shroud may be positioned to cover and house the compression springs to avoid or reduce corrosion to the compression springs.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
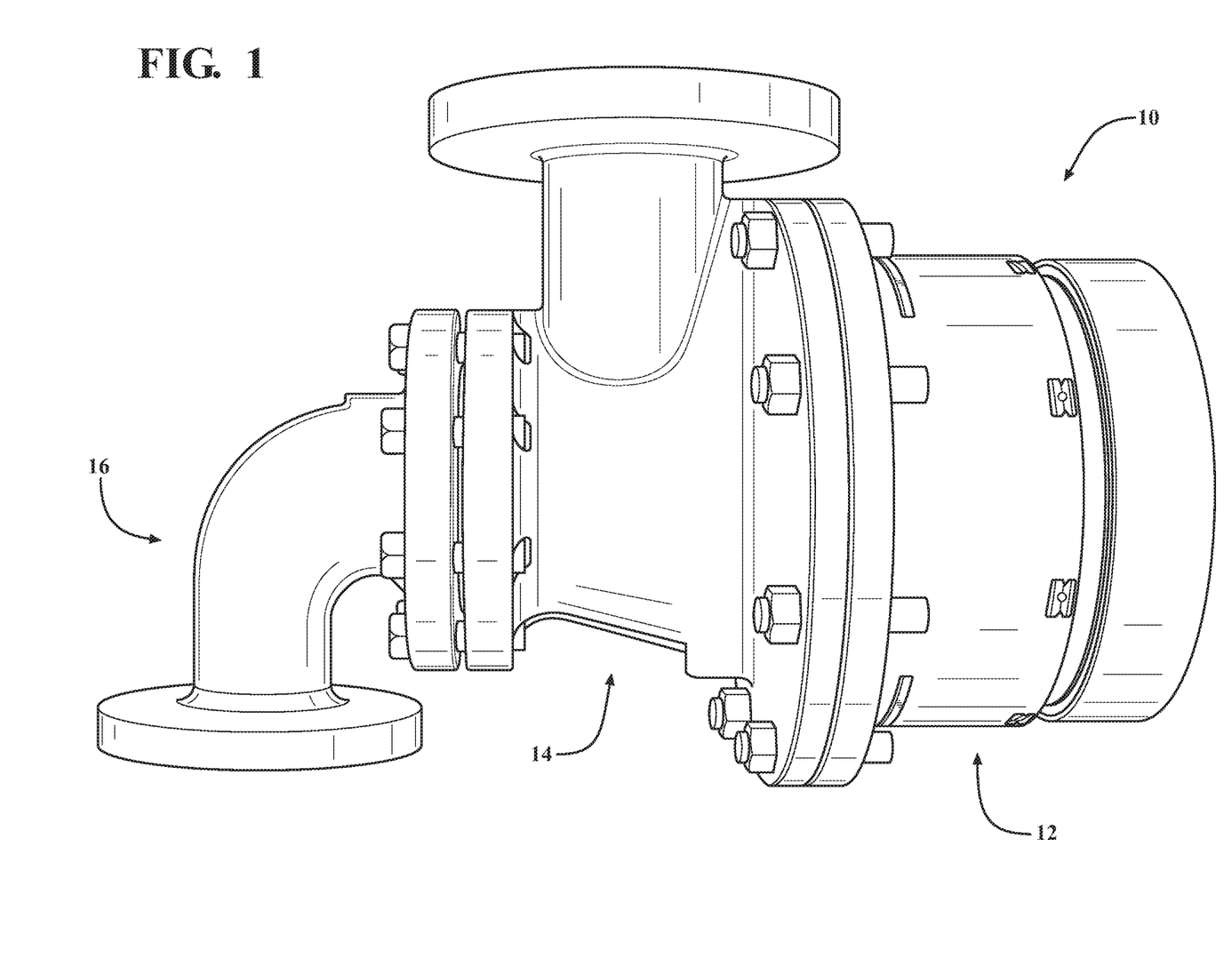
FIG. 1 is a perspective view of the rotary joint attached to the inlet coupling and the outlet coupling of the present disclosure.

The present disclosure relates to a rotary joint or rotary joint cartridge 10 which may be used in combination with a rotating drying cylinder (not shown) of a paper manufacturing machine (not shown). The rotary joint 10 provides a sealed connection to the drying cylinder to communicate pressurized steam, water, and air to and from the drying cylinder. As seen in FIG. 1, the rotary joint 10 has a body portion 12 having one end connected to the drying cylinder and an opposite end connected to an inlet coupling or joint body 14 which receives pressurized steam and air from a pressurized source (not shown). An outlet coupling 16 is connected to and in communication with the inlet coupling 14 to direct steam, condensate, and air from the drying cylinder. Separate passageways (not shown) are provided to allow pressurized steam and air to flow from the inlet coupling 14 to the drying cylinder. A syphon (not shown) is installed down the center of the inlet coupling 14, seated against a conical taper in the inlet coupling 14, and secured with a hollow bolt (not shown) to the outlet coupling 16 allowing the exit of steam, condensate, and air from the drying cylinder through the outlet coupling 16.

Figure 2:
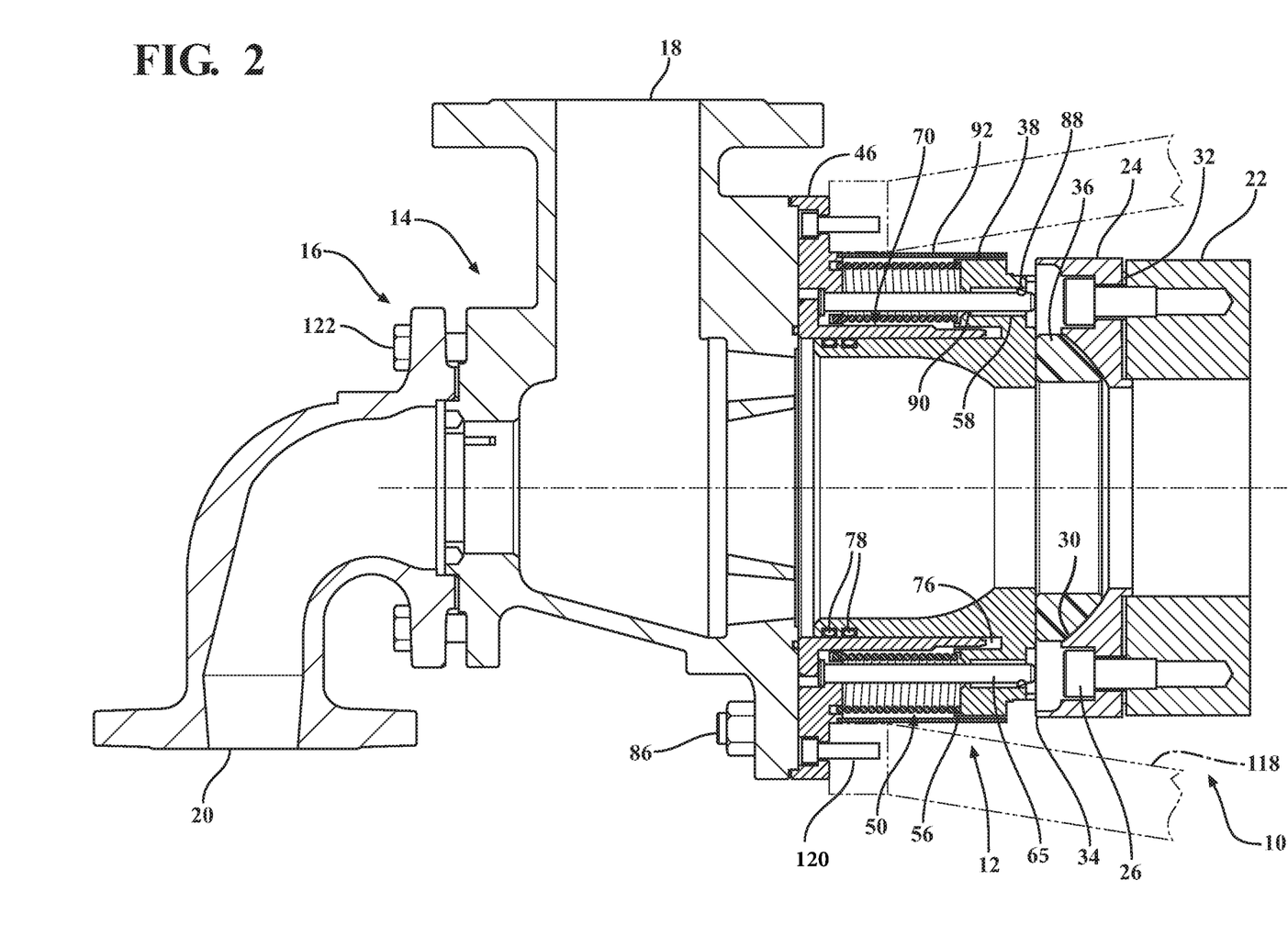
FIG. 2 is a cross-sectional view of the rotary joint, the inlet coupling, and the outlet coupling of the present disclosure.

To direct pressurized steam and air to the drying cylinder, the inlet coupling 14 has an inlet 18 for receiving pressurized steam and air from the pressurized source, as seen in FIGS. 1-2. The inlet 18 is in communication with an inlet passageway (not shown) that extends through the inlet coupling 14 and through the body portion 12 of the rotary joint 10. The outlet coupling 16 is connected to the inlet coupling 14 and has an outlet 20 for allowing pressurized steam, condensate, and air to escape from the drying cylinder. The outlet 20 is in communication with an outlet passageway (not shown) that extends through the outlet coupling 16 and is in communication with an outlet pipe (not shown) that extends from the outlet coupling 16, through the inlet coupling 14 and the body portion 12 of the rotary joint 10, and into the drying cylinder. The interior of the outlet pipe defines the outlet passageway, and the inlet passageway is defined by an annular space (not shown) adjacent the outer circumference of the outlet pipe. The outlet pipe is sealed between the inlet coupling 14 and the outlet coupling 16 such that the incoming pressurized steam and air are separated from the outgoing pressurized steam, condensate, and air.

Figure 3:
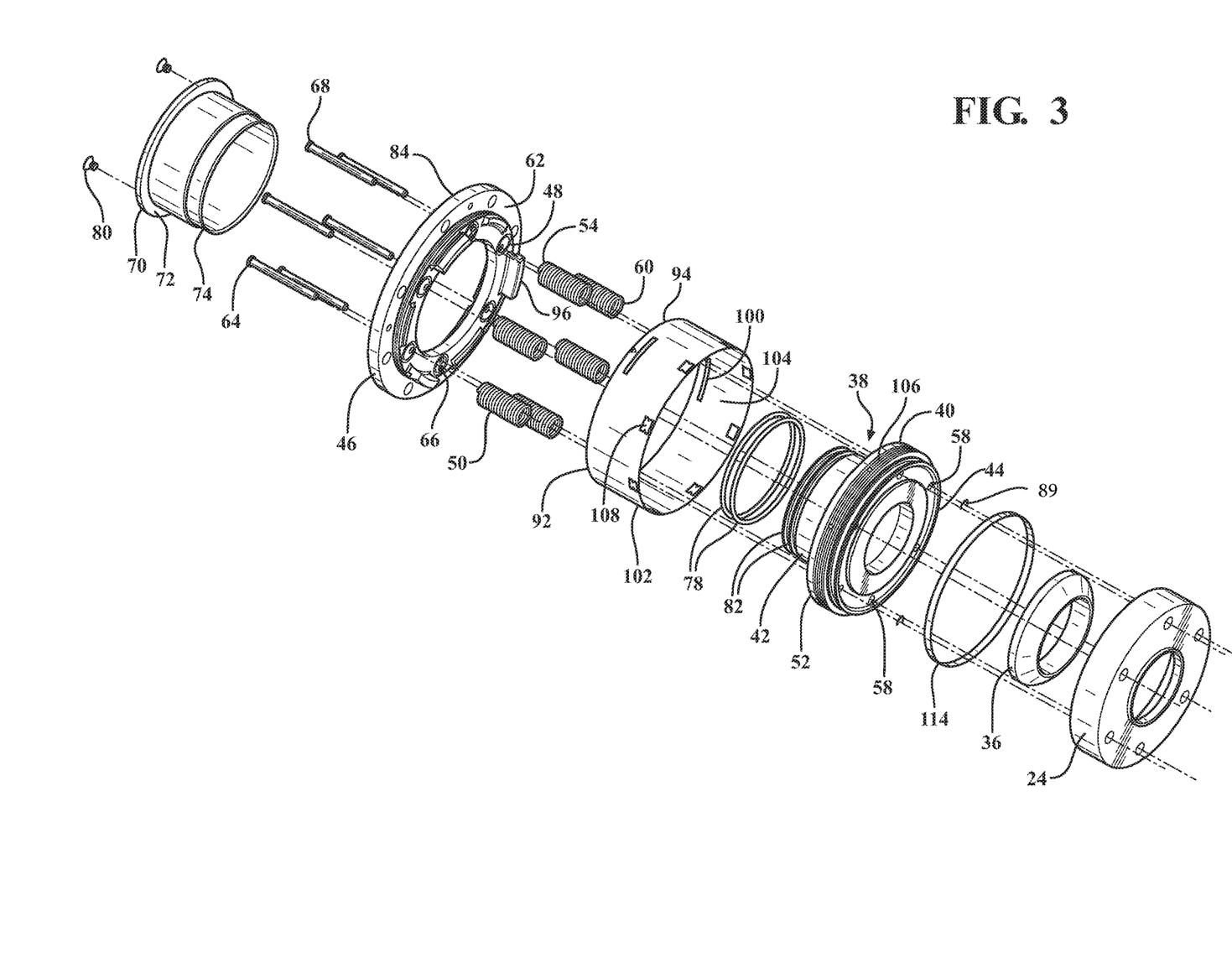
FIG. 3 is an exploded perspective view of the rotary joint of the present disclosure.
Figure 4:
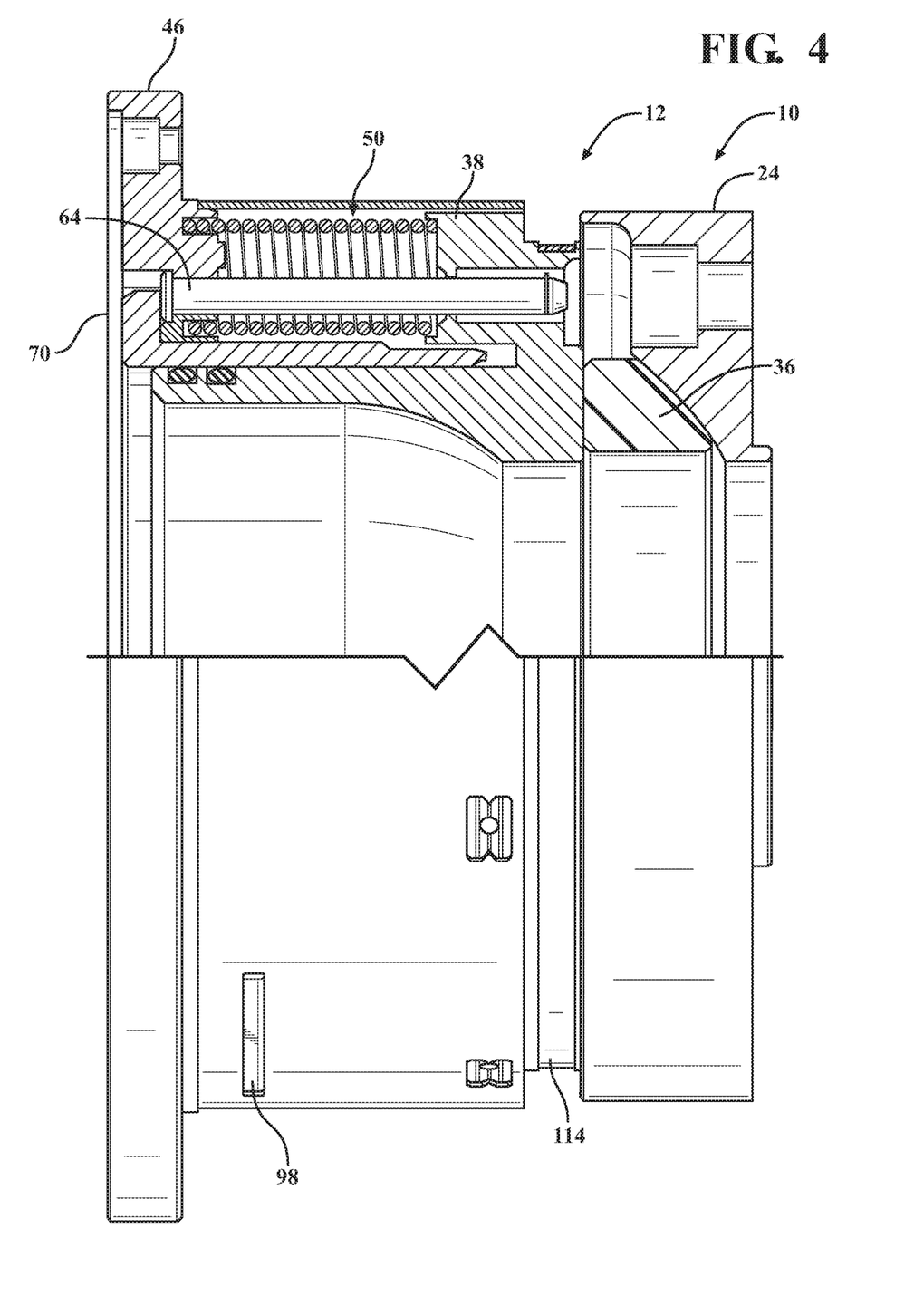
FIG. 4 is a partial front plan view and sectional view of the rotary joint of the present disclosure.
Figure 5A:
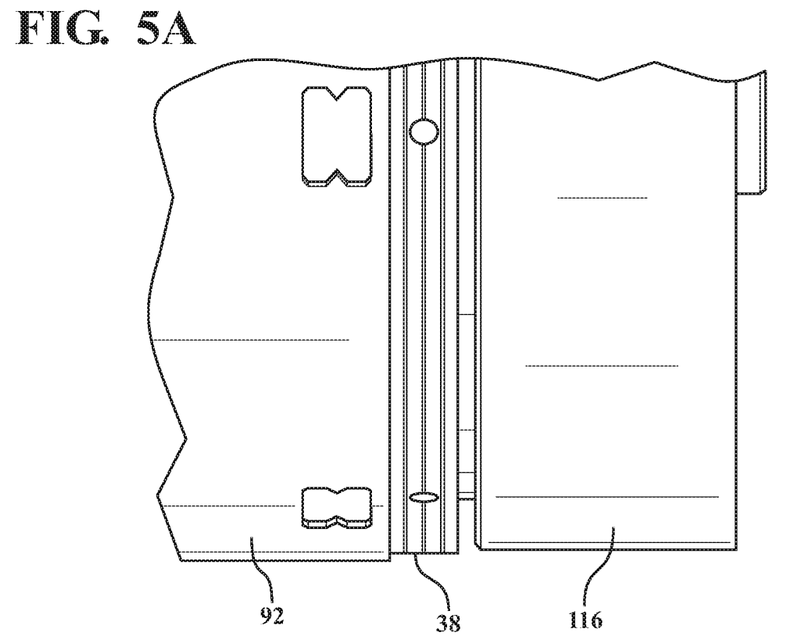
FIG. 5A is a front plan view showing the seal wear indicator of the rotary joint of the present disclosure when the seal ring is worn.
Figure 5B:
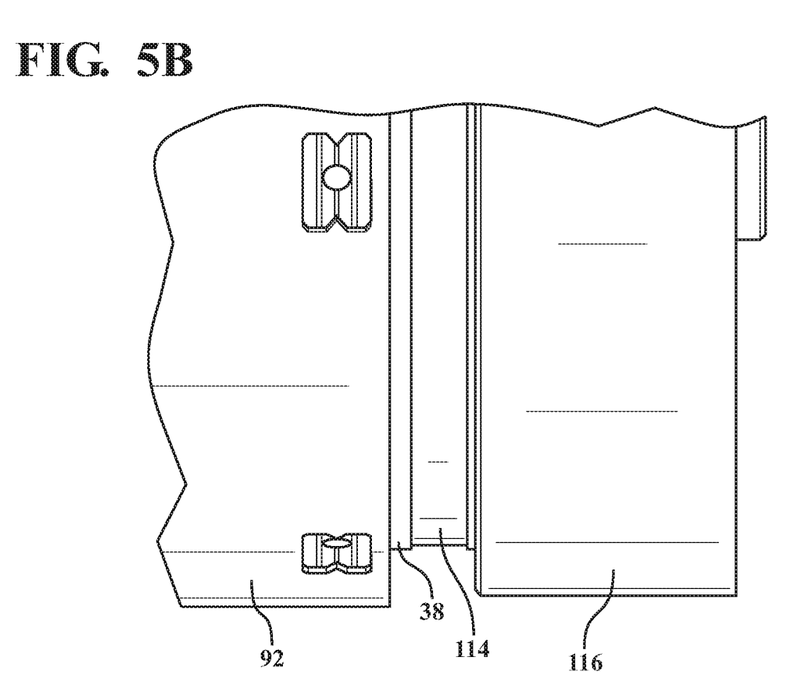
FIG. 5B is a front plan view showing the seal wear indicator of the rotary joint of the present disclosure when the seal ring is not worn.
Figure 6A:
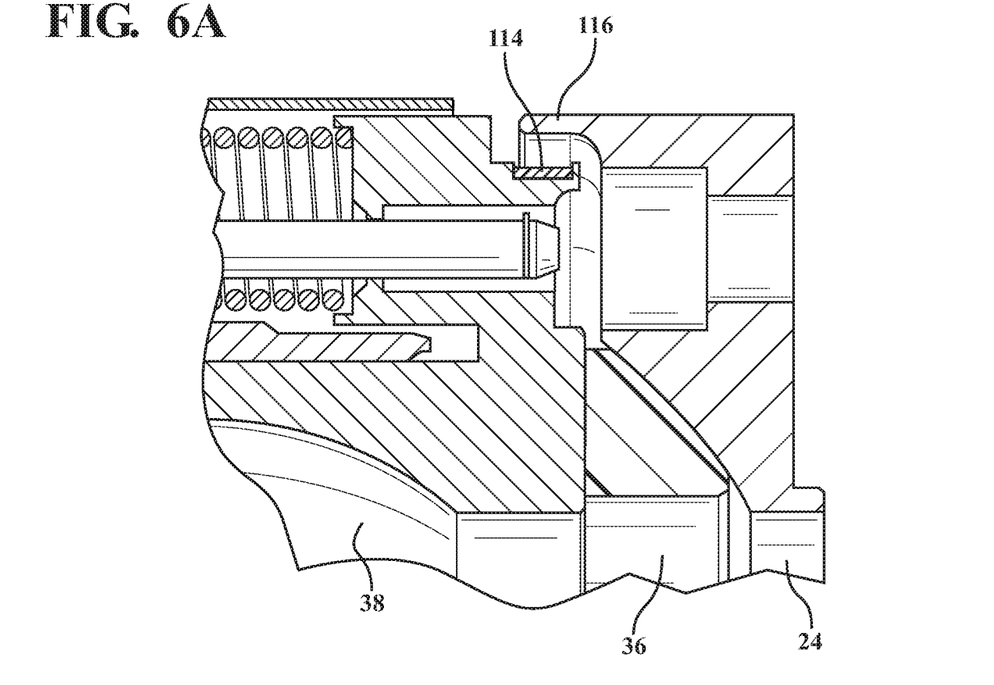
FIG. 6A is a sectional view showing the seal wear indicator and the seal ring of the rotary joint of the present disclosure when the seal ring is worn.
Figure 6B:
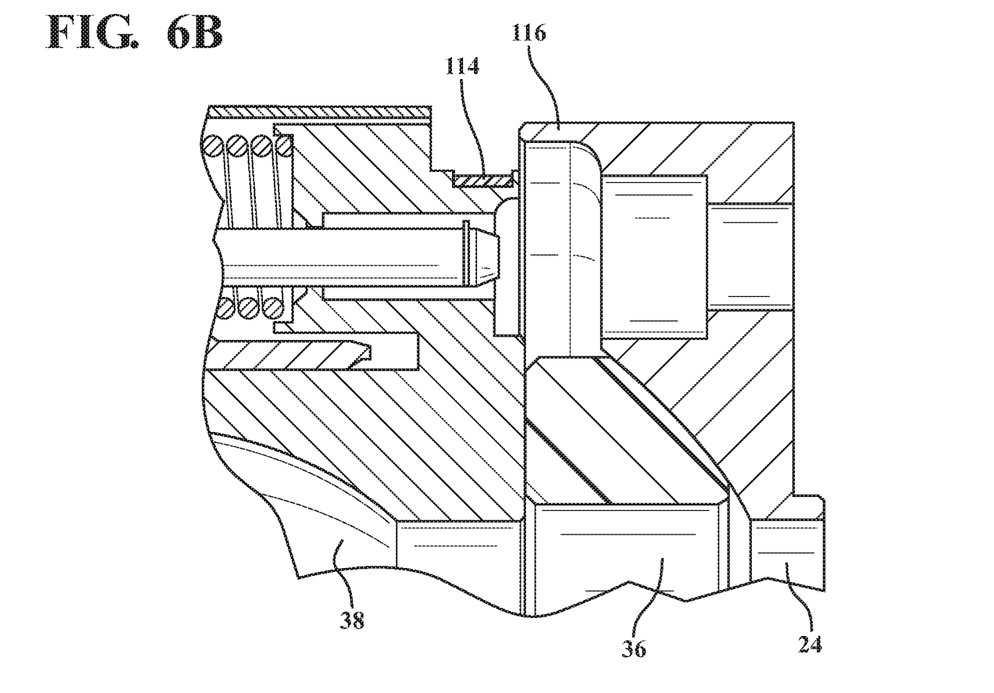
FIG. 6B is a sectional view showing the seal wear indicator and the seal ring of the rotary joint of the present disclosure when the seal ring is not worn.

In order to provide a seal between the rotating drying cylinder of the paper manufacturing machine and the stationary body portion 12 of the rotary joint 10, the drying cylinder provides a rotating journal end 22 having a substantially cylindrical shape extending from the drying cylinder, as seen in FIGS. 2-4. The rotary joint 10 provides a substantially cylindrical shaped wear plate 24 having a plurality of similar apertures that are aligned with corresponding threaded apertures in the journal end 22 of the drying cylinder. Conventional fasteners 26 extend through the apertures in the wear plate 24 and thread into the threaded apertures in the journal end 22 to connect a front side 32 of the wear plate 24 to the journal end 22 thereby rotating the wear plate 24 with the journal end 22. The wear plate 24 further provides a substantially concave or angular recess 30 extending from an inside diameter of the wear plate 24 toward a back side 34 of the wear plate 24 facing the body portion 12 of the rotary joint 10. The recess 30 in the wear plate 24 complementarily or matingly receives a substantially cylindrical seal ring 36 having an outer surface that is substantially convex or frustoconical in shape so as to be complementarily or matingly received by the recess 30 in the wear plate 24. The wear plate 24 rotates on the seal ring 36, wherein the seal ring 36 is allowed to rotate with the wear plate 24, remain stationary with a piston 38, or rotate at an intermittent speed depending on the tribological properties of the mating components. Thus, the seal ring 36 is susceptible to wear while still maintaining a seal between the body portion 12 and the wear plate 24 of the rotary joint 10. The seal ring 36 is fabricated from a material that wears well while still having sealing characteristics, such as but not limited to, a metalloid, such as antimony.

To maintain the position and sealing characteristics of the seal ring 36 while the wear plate 24 is rotating, the piston or nipple 38 is spring biased and provided in the body portion 12 of the rotary joint 10. The piston 38 is substantially cylindrical and has a mushroom shaped configuration having a larger head portion 40 and a smaller stem portion 42 extending integrally from the head portion 40. A substantially flat front end 44 of the head portion 40 of the piston 38 engages the seal ring 36 by continually applying a spring-biased force to the seal ring 36 so that the seal ring 36 remains seated in the recess 30 of the rotating wear plate 24.

The piston 38 is spring biased through the use of a substantially cylindrical end flange 46 having a plurality of similar circumferentially spaced, recessed rings 48 formed in a front side 62 of the end flange 46 for receiving and seating a first end 54 of each of a plurality of similar compression springs 50. A backside 52 of the head portion 40 of the piston 38 also has similar substantially circular recessed portions 56 for seating a second end 60 of each of the compression springs 50. A plurality of similar apertures 58 extend through the head portion 40 of the piston 38 and are aligned, but coaxially offset, with the recessed rings 48 in the end flange 46 and the circular recesses 56 in the head portion 40 of the piston 38. The end flange 46 also has a plurality of similar apertures 66 that extend through the end flange 46 and in alignment and coaxial with the apertures 58 in the head portion 40 of the piston 38 thereby being aligned with and axially offset from the recessed rings 48 in the end flange 46. A plurality of quick release pins 65, as shown in FIG. 2, or a plurality of clevis pins 64, as shown in FIGS. 3, 4, 6A, and 6B, extend from a backside 84 of the end flange 46 through the apertures 66 in the end flange 46, the compression springs 50, and the apertures 58 in the head portion 40 of the piston 38. It should be noted that the quick release pins 65 or the clevis pins 64 may be used or a combination thereof. In a non-limiting disclosure, six of the quick release pins 65 or six of the clevis pins 64 may be used; however, other numbers of the quick release pins 65 and the clevis pins 64 may be utilized. Since the apertures 58, 66 are coaxially offset from the recessed rings 48 in the end flange 46 and the circular recesses 56 in the head portion 40 of the piston 38, the quick release pins 65 or the clevis pins 64 extend through the compression springs 50 in a non-coaxial manner. The quick release pins 65 and the clevis pins 64 each have a head 68 larger than the apertures 66 in the end flange 46 thereby preventing the head 68 of the quick release pins 65 or the clevis pins 64 from passing through the apertures 66 in the end flange 46. An end cap 70 has a substantially cylindrical, mushroom shaped configuration with a larger head portion 72 and a smaller stem portion 74. The head portion 72 engages the head 68 of the quick release pins 65 or the clevis pins 64, and the stem 74 of the end cap 70 extends between the piston 38 and the compression springs 50. The stem 74 of the end cap 70 receives the stem 42 of the piston 38 in a coaxial manner, and the head portion 40 of the piston 38 provides an annular recess 76 for receiving the end of the stem 74 of the end cap 70. A pair of similar flexible O-rings 78 are seated in a pair of similar annular recesses 82 in the stem 42 of the piston 38 to provide a seal between the stem 74 of the end cap 70 and the stem 42 of the piston 38. The head portion 72 of the end cap 70 is connected to the end flange 46 through a pair of setscrews 80. The inlet coupling 14 is substantially coplanar with and abuts the head portion 72 of the end cap 70 and the backside 84 of the end flange 46, and the end flange 46 is connected to the inlet coupling 14 through the use of conventional fasteners 86.

To maintain the body portion 12 of the rotary joint 10 in an assembled and loaded position prior to the installation of the rotary joint 10 to the journal end 22 of the drying cylinder, the free end of the quick release pins 65 or the clevis pins 64 extend beyond the second end 60 of the compression springs 50 and are received by the apertures 58 in the piston 38 which correspond in number and alignment to the apertures 66 in the end flange 46. The apertures 58 in the piston 38 have a narrowing 90 toward the second end 60 of the compression springs 50 and become larger beyond the narrowing 90 toward the front end 44 of the piston 38. The quick release pins 65 each have a spring-loaded tab 88 located toward the free end of the quick release pins 65 such that when the quick release pins 65 are inserted into the apertures 58 of the piston 38, the tabs 88 retract at the narrowing 90 of the aperture 58 and expand outward upon passing the narrowing 90 and entering the larger portion of the aperture 58. The tabs 88 are shaped such that the quick release pins 65 cannot be withdrawn beyond the narrowing 90 in the apertures 58 of the piston 38 toward the compression springs 50 without using a tool (not shown) to retract the tabs 88. Alternatively, the clevis pins 64 may be inserted into the apertures 58 of the piston 38, wherein the clevis pins 64 extend past the narrowing 90 of the aperture 58 and enter the larger portion of the aperture 58. Retaining rings 89 are inserted into annular recesses provided on at least two of the clevis pins 64 to prevent the clevis pins 64 from being withdrawn past the narrowing 90 in the apertures 58 of the piston 38 toward the compression springs 50 without removing the retaining rings 89. The tabs 88 of the quick release pins 65 and the retaining rings 89 of the clevis pins 64 allow the body portion 12 of the rotary joint 10 to remain in an assembled, slightly loaded position for shipping and installation, as the end flange 46, the compression springs 50, the piston 38, the quick release pins 65 and/or the clevis pins 64, and the end cap 70 are assembled together with the compression springs 50 being slightly compressed. It should be noted that the present disclosure is not limited to using the quick release pins 65 or the clevis pins 64 as disclosed, but rather, other pin mechanisms may be utilized.

The amount of pressure applied to the seal ring 36 by the piston 38 is critical in order to provide the proper wearing and sealing characteristics of the seal ring 36 relative to the wear plate 24. The distance between the end flange 46 and the piston 38 determines the amount of compression applied to the compression springs 50, which in turn relates to the amount of pressure or force applied by the piston 38 to the seal ring 36. Thus, the distance between the end flange 46 and the piston 38 must be carefully monitored especially during the installation and set-up of the rotary joint 10 to the drying cylinder. To provide a simple and accurate method for determining the proper distance between the end flange 46 and the piston 38, a substantially cylindrical shroud 92 is placed between the end flange 46 and the piston 38. A first end 94 of the shroud 92 is seated within an annular recess provided in the end flange 46, and in addition, the end flange 46 has a plurality of arcuate tabs 96 that extend outward from the front side 62 of the end flange 46. In a non-limiting disclosure, the present disclosure shows three arcuate tabs 96, but other numbers of arcuate tabs 96 may be utilized. Each tab 96 has a radially outwardly extending engagement portion 98 that engages corresponding slots 100 in the shroud 92 by way of a snap fit. That is, the shroud 92 is slightly flexible such that when the shroud 92 is placed over the tabs 96, the shroud 92 flexes outward until the engagement portions 98 engage the slots 100 thereby allowing the shroud 92 to flex back to its relaxed position. The tabs 96 allow for easy assembly of the shroud 92 onto the rotary joint 10 without the use of fasteners or other connecting means. The second, opposite end 102 of the shroud 92 extends over the outside diameter of the head portion 40 of the piston 38 thereby allowing the shroud 92 to encompass and house the compression springs 50. By housing the compression springs 50, the shroud 92 assists in preventing steam, water, and chemicals from corroding the compression springs 50 thereby reducing or eliminating the need to clean and maintain the compression springs 50 due to corrosion and rust. Vents 104, in the form of apertures, may extend through the shroud 92 to assist in identifying leaks from the seals and to prevent internal pressurization caused from a leak. The vents 104 may be in the form of letters to advertise the manufacturer of the rotary joint 10.

Figure 7:
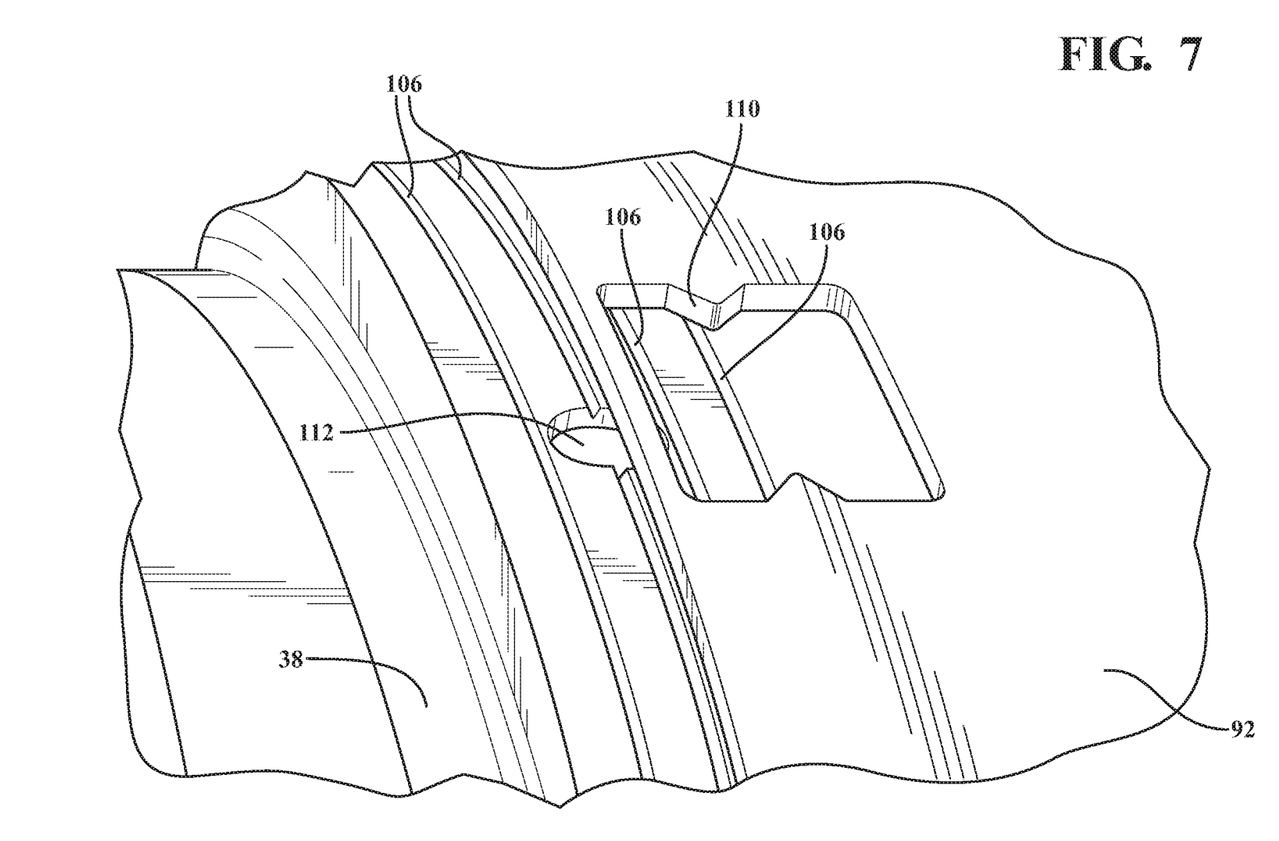
FIG. 7 is a perspective view showing the alignment recess rings of the piston and the alignment apertures of the shroud of the rotary joint of the present disclosure.

To determine the proper compression of the compression springs 50 and provide a set-up gauge for the rotary joint 10, the head portion 40 of the piston 38 has a plurality of axially and equally spaced, substantially parallel, similar annular recesses or rings 106 formed in the outside diameter of the head portion 40 of the piston 38, as best seen in FIGS. 3 and 7. It should be noted that the present disclosure is not limited to a plurality of annular recesses or rings 106, but rather, the present disclosure also anticipates the use of one annular recess or ring 106. Since the recessed annular rings 106 are axially spaced, the recessed annular rings 106 act as a way to measure the distance between the end flange 46 and the piston 38 when compared to the relative position of the second end 102 of the shroud 92 on the head portion 40 of the piston 38. To further assist in identifying the desired distance between the end flange 46 and the piston 38, the shroud 92 has several similar apertures 108 extending through the second end 102 of the shroud 92 over-lapping the head portion 40 of the piston 38. The apertures 108 in the shroud 92 act as windows to view the recessed annular rings 106 in the piston 38. Similarly shaped pointers or locators 110 may be formed in the apertures 108 by having a triangular portion of the shroud 92 extend into the apertures 108 to accurately assess the position of the recessed annular rings 106 in the piston 38. Small circular recesses or identifiers 112 may be placed in one of the recessed annular rings 106 to identify the ideal or target set-up position for the rotary joint 10. The annular recessed rings 106 extending beyond the annular recessed ring 106 with the circular recess 112 may then correspond to an amount of variance extending from the target set-up position. For instance, each annular recessed ring 106 may correspond to an additional plus or minus 3 mm extending form the target set-up position.

In order to monitor the wear of the seal ring 36, a seal wear indicator 114 is placed on the head portion 40 of the piston 38, as seen in FIGS. 5A, 5B, 6A, and 6B. The seal wear indicator 114 may comprise an annular ring that is seated in an annular recess in the head portion 40 of the piston 38 and can be viewed in an annular space established between the second end 102 of the shroud 92 and the wear plate 24. The seal wear indicator 114 is "self-zeroing" in that the seal wear indicator 114 does not require intervention by the installer to set the starting point of the seal wear indicator 114. The seal wear indicator 114 may have an illuminated color for easy visibility. The space between the shroud 92 and the wear plate 24 is at its largest when the seal ring 36 is at its largest size such as when the seal ring 36 has little or no wear. When the seal ring 36 has little or no wear, the entire seal wear indicator 114 can be viewed from outside the rotary joint 10 thereby indicating to a user that the seal ring 36 has little or no wear, and thus, the seal ring 36 does not need to be replaced. This is referred to as the exposed position. As the seal ring 36 wears, the seal ring 36 becomes smaller, and the spring-biased piston 38 moves away from the stationary shroud 92 and closer toward the wear plate 24 in order to keep the seal ring 36 seated and engaged against the wear plate 24. As this occurs, the seal wear indicator 114 begins to move into the wear plate 24 under an outer circumferential lip 116 of the wear plate 24 thereby blocking portions of the seal wear indicator 114 from being seen from outside the rotary joint 10. Once the seal ring 36 becomes too worn, the seal wear indicator 114 is completely blocked from view from outside the rotary joint 10 thereby indicating to the user that the seal ring 36 must be replaced. This is referred to as the non-exposed position. The seal wear indicator 114 provides a simple method and apparatus for indicating the amount of wear on the seal ring 36 without having to dissemble or measure the rotary joint 10.

When installing the rotary joint 10 to a drying cylinder of a paper-manufacturing machine, the wear plate 24 is connected to the journal end 22 of the rotating drying cylinder of the paper-manufacturing machine, and the seal ring 36 is seated within the wear plate 24. The body portion 12 of the rotary joint 10 is preassembled as previously described and moved into place to be connected to the wear plate 24 wherein the front end 44 of the piston 38 engages the seal ring 36. The body portion 12 of the rotary joint 10 is properly positioned by having the shroud 92 overlap the head portion 40 of the piston 38 and having the apertures 108 in the shroud 92 extend over the recessed alignment rings 106 in the head portion 40 of the piston 38. The end flange 46 is then driven or pushed toward the piston 38 thereby compressing the compression springs 50 and moving the quick release pins 65 or the clevis pins 64 forward into the apertures 58 in the piston 38. Once the end flange 46 is driven toward the wear plate 24 and the springs 50 are compressed, the end flange 46 is rigidly connected to a rigid bracket 118 through the use of a plurality of conventional fasteners 120. The bracket 118, in turn, is connected to a stationary mounting flange (not shown) on the drying cylinder. The bracket 118 is previously measured, and the rotary joint 10 is designed such that the springs 50 are properly compressed when the rotary joint 10 is connected to the bracket 118 in the installed position. To ensure and check the proper position or set-up of the end flange 46 relative to the piston 38, the alignment of the rotary joint 10 is determined by viewing the alignment recess rings 106 in the head portion 40 of the piston 38 through the apertures 108 of the shroud 92. Ideally, the circular recess 112 on one of the recessed alignment rings 106 should be aligned with the pointer 110 in the aperture 108 of the shroud 92. However, alignment is still acceptable if the circular recess 112 is not viewable in the aperture 108 of the shroud 92, but rather, one of the other alignment rings 106 is viewable in the aperture 108 of the shroud 92. The alignment rings 106 are axially spaced 3 mm from each other, thereby indicating that the rotary joint 10 is off alignment by 3 mm for each adjacent alignment ring 106 viewed through the aperture 108 in the shroud 92. The rotary joint 10 can only be off alignment by a maximum of plus or minus 6 mm or two alignment rings 106 from the center or aligned position. Once connected to the bracket 118, the alignment of the rotary joint 10 is inspected by viewing the alignment rings 106 in the aperture 108 of the shroud 92. If alignment is improper, proper steps may be taken to properly align the rotary joint 10 through the addition of shims between the end flange 46 and the bracket 118 or through some other adjustment means. If alignment is proper, then the inlet coupling 14 is connected to the end flange 46 via the conventional fasteners 86, and the outlet coupling 16 is connected to the inlet coupling 14 by way of conventional fasteners 122.

While the disclosure has been made in connection with what is presently considered to be the most practical and preferred embodiment, it should be understood that the disclosure is intended to cover various modifications and equivalent arrangements.

What is claimed is:

1. A rotary joint for connecting a stationary body to a rotating body, comprising:
    a rotatable wear plate connectable to the rotating body and having a seal ring seated against the wear plate;
    a nonrotatable piston having a plurality of alignment rings formed on the piston, and the piston being biased toward the seal ring, wherein the piston engages the seal ring to bias and maintain the seating of the seal ring against the wear plate; and
    a shroud having at least a portion of the piston disposed therein, and the shroud having at least one aperture extending there through for viewing the position of the alignment rings and determining the position of the piston.

2. The rotary joint stated in claim 1, wherein the plurality of alignment rings further comprises:
    annular, substantially parallel recesses that are axially and equally spaced at predetermined distances.

3. The rotary joint stated in claim 1, further comprising:
    the piston being biased against the wear plate by at least one compression spring.

4. The rotary joint stated in claim 1, further comprising:
    the shroud having a locator that extends into each of the at least one aperture to assess the position of the at least one annular alignment ring.

5. The rotary joint stated in claim 1, further comprising:
    an identifier located on the piston to identify which one of the at least one alignment ring is the ideal position for the piston.

6. The rotary joint stated in claim 1, further comprising:
    a seal wear indicator formed on the piston, and the seal wear indicator at least partially viewable between the shroud and the wear plate, wherein the amount of the seal wear indicator viewed corresponds to the amount of wear associated with the seal ring.

7. A rotary joint for connecting a stationary body to a rotating body, comprising:
    a rotatable wear plate connectable to the rotating body and having a seal ring seated in the wear plate;
    a spring biased piston for engaging and maintaining the seating of the seal ring against the wear plate, wherein the piston is spring biased by a plurality of compression springs that are compressed between an end flange and the piston to bias the piston toward the seal ring;
    a shroud connected to the end flange, and the end flange and the piston being at least partially disposed within the shroud, wherein the shroud has at least one aperture extending there through; and
    the piston having a plurality of annular alignment rings formed thereon, and the plurality of alignment rings viewable through the at least one aperture in the shroud to confirm the proper distance between the end flange and the piston in order to establish the proper spring force applied to the piston against the seal ring.

8. The rotary joint as stated in claim 7, further comprising:
    the plurality of annular alignment rings comprising annular recesses that are substantially parallel and axially and equally spaced at predetermined distances.

9. The rotary joint as stated in claim 7, further comprising:
    a seal wear indicator connected to the piston and moving between an exposed position, wherein the seal ring is not worn, and a non-exposed position, wherein the seal ring is worn.

10. The rotary joint as stated in claim 9, further comprising:
    the seal wear indicator having an annular ring seated within an annular recess on the piston, wherein the annular ring is visible between the shroud and the seal ring in the exposed position, and wherein the annular ring is not visible between the shroud and the seal ring when the annular ring is in the non-exposed position.

11. The rotary joint as stated in claim 7, further comprising:
    the shroud having a pointer that extends into each of the at least one aperture to assess the position of the plurality of alignment rings.

12. The rotary joint as stated in claim 7, further comprising:
    an identifier located on the piston to identify which of the plurality of alignment rings identifies the ideal position for the piston.

13. The rotary joint as stated in claim 12, wherein the identifier further comprises:
    an aperture extending through one of the plurality of alignment rings in the piston, and the aperture in the piston circumferentially aligned with the at least one aperture in the shroud to view the aperture in the piston through the at least one aperture in the shroud.

14. The rotary joint as stated in claim 7, further comprising:
    the shroud being connected to the end flange via a snap fit, wherein the end flange has tabs that extend from the end flange and are received by and extend into corresponding apertures provided in the shroud.

15. The rotary joint as stated in claim 7, further comprising:
    the shroud having at least one vent comprising apertures extending through the shroud to view and allow fluid to escape through the at least one vent should any fluid inadvertently escape from the rotary joint.

16. The rotary joint as stated in claim 7, further comprising:
    the shroud positioned to cover and house the compression springs to avoid or reduce corrosion to the compression springs.

17. A rotary joint for connecting a stationary body to a rotating body, comprising:
    a rotatable wear plate connectable to the rotating body and having a seal ring seated in the wear plate;
    a spring biased piston for engaging and maintaining the seating of the seal ring against the wear plate, wherein the piston is spring biased by a plurality of compression springs that are compressed between an end flange and the piston to bias the piston toward the seal ring;
    a shroud connected to the end flange, and the end flange and the piston being at least partially disposed within the shroud, wherein the shroud has at least one aperture extending there through;
    the piston having a plurality of annular alignment rings formed therein, and the plurality of alignment rings viewable through the at least one aperture in the shroud to confirm the proper distance between the end flange and the piston in order to establish the proper spring force applied to the piston and against the seal ring; and a seal wear indicator connected to the piston and moving between an exposed position, wherein the seal ring is not worn, and a non-exposed position, wherein the seal ring is worn.

18. The rotary joint as stated in claim 17, further comprising:

the plurality of annular alignment rings comprising annular recesses that are formed in the piston, substantially parallel, and axially and equally spaced at predetermined distances.

19. The rotary joint as stated in claim 17, further comprising:

the seal wear indicator having an annular ring seated within an annular recess in the piston, wherein the annular ring is visible between the shroud and the seal ring in the exposed position, and wherein the annular ring is not visible between the shroud and the seal ring when the seal ring is in the non-exposed position.

20. The rotary joint as stated in claim 17, further comprising:

the shroud being connected to the end flange via a snap fit, wherein the end flange has tabs that extend from the end flange and are received by and extend into corresponding apertures provided in the shroud.

\* \* \* \* \*